Jan. 5, 1965    C. E. EVANSON ETAL    3,164,490
AUTOMATIC COATING DEPOSITOR
Filed Dec. 4, 1961    7 Sheets-Sheet 1
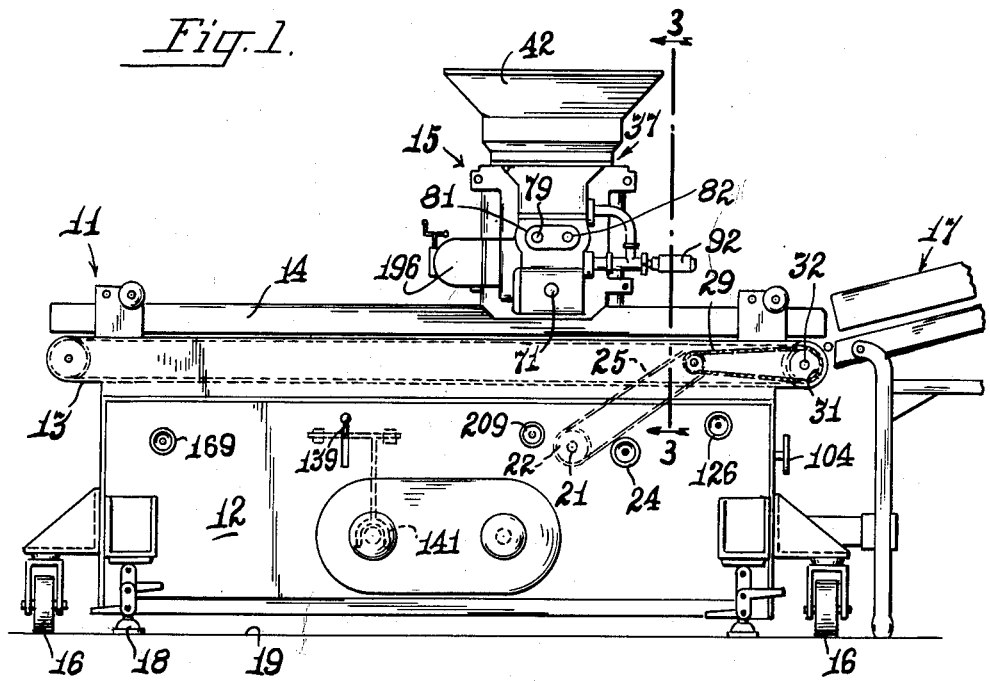
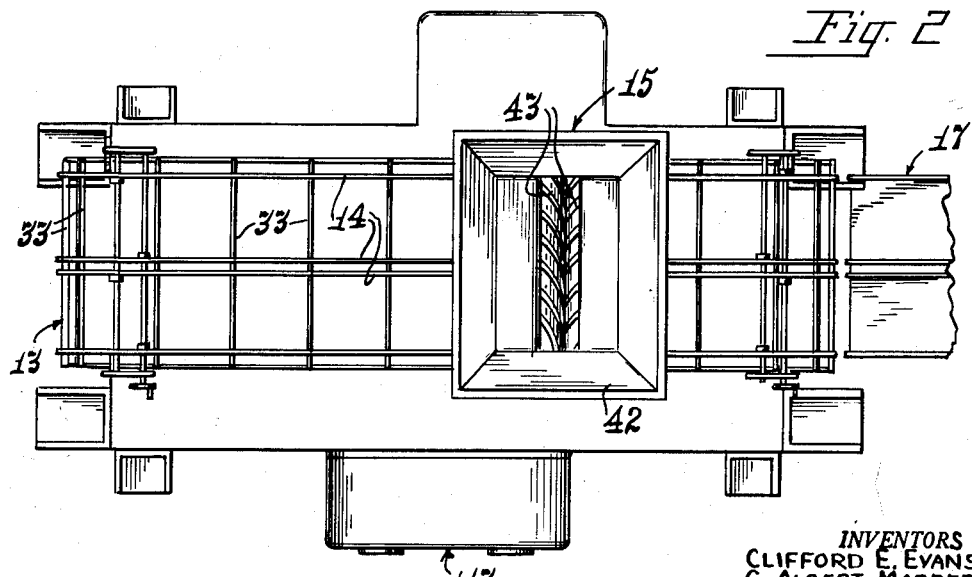
INVENTORS
CLIFFORD E. EVANSON
G. ALBERT MARBERG
J. RICHARD MOTA
BY
Attorney.

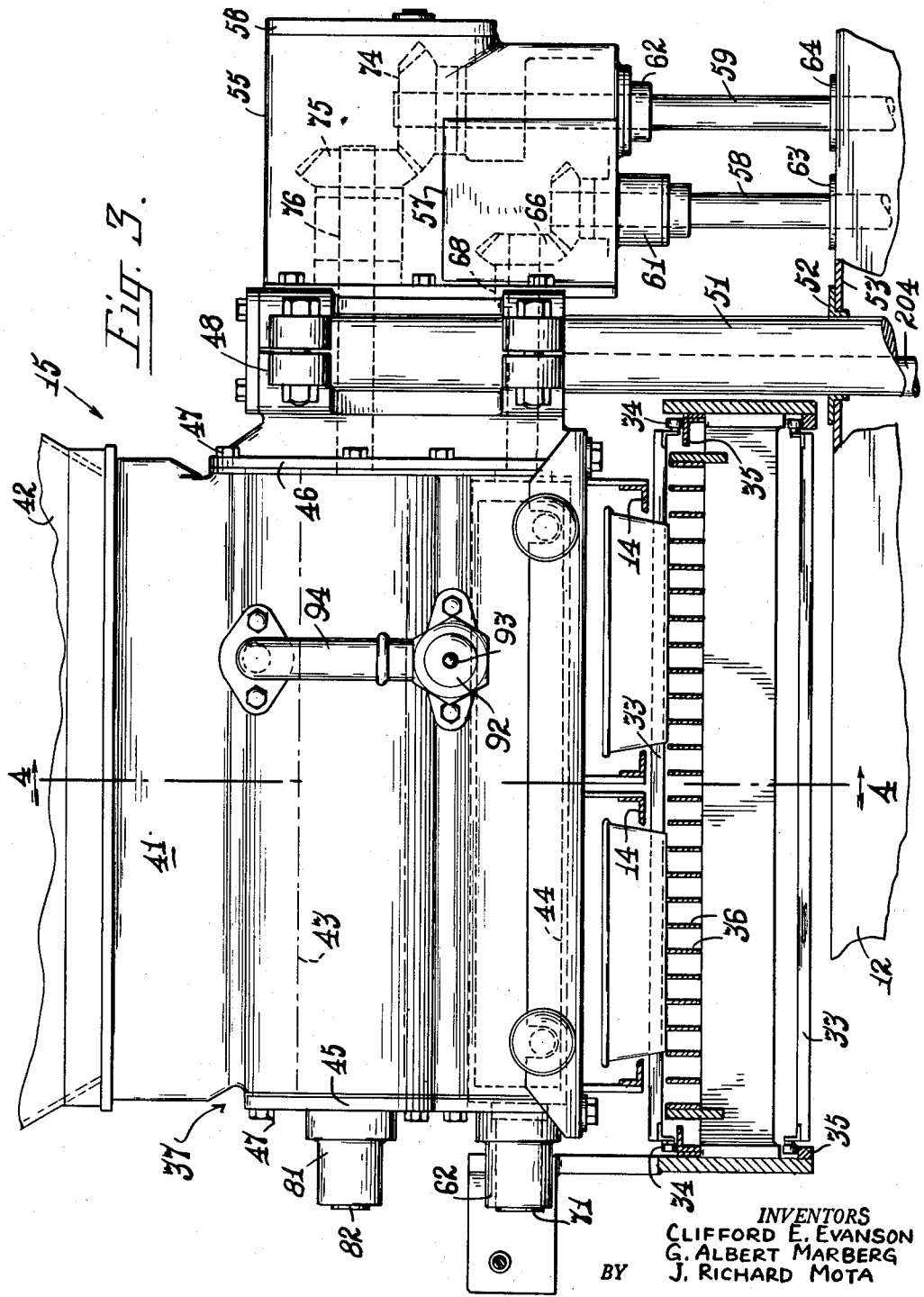

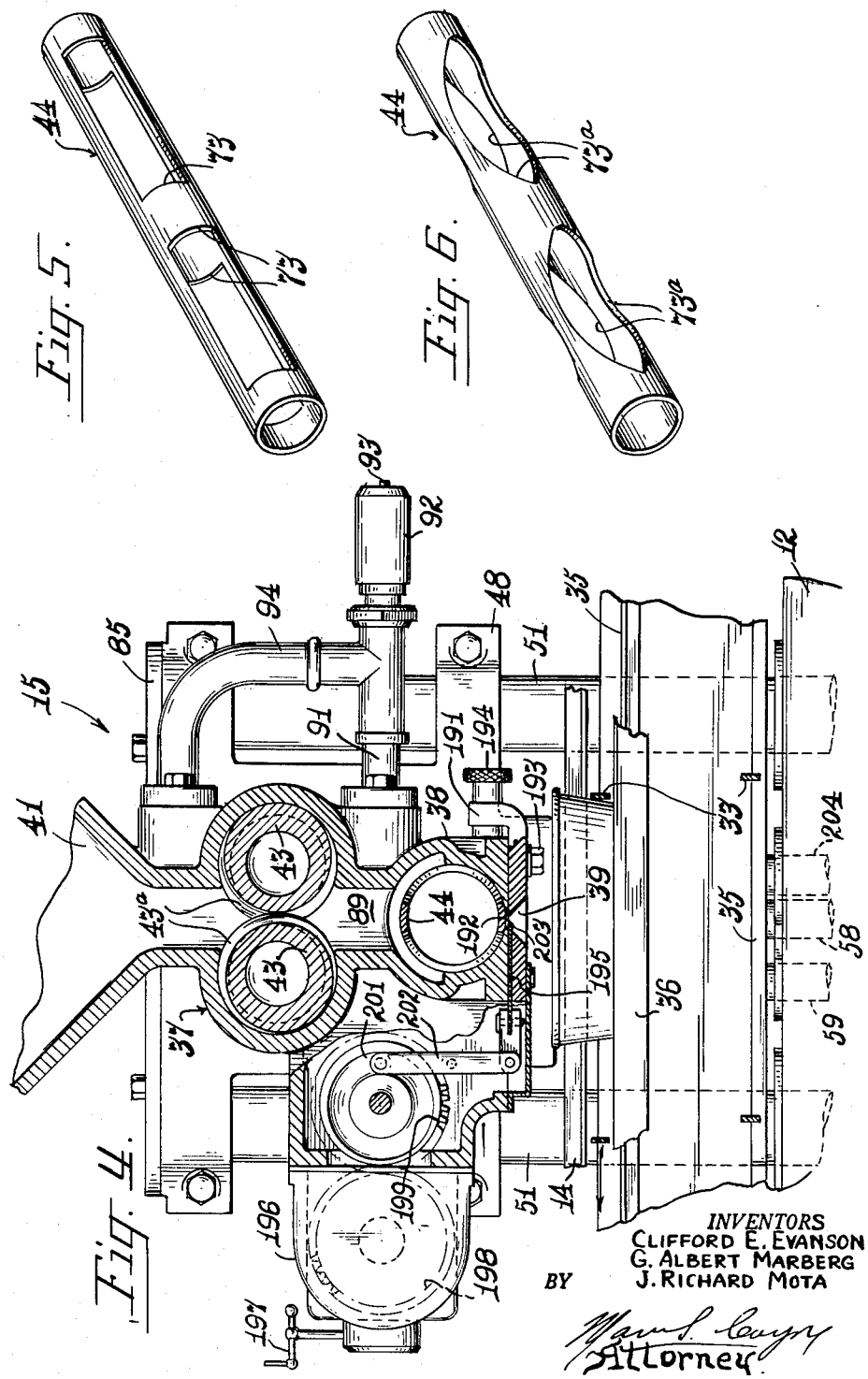

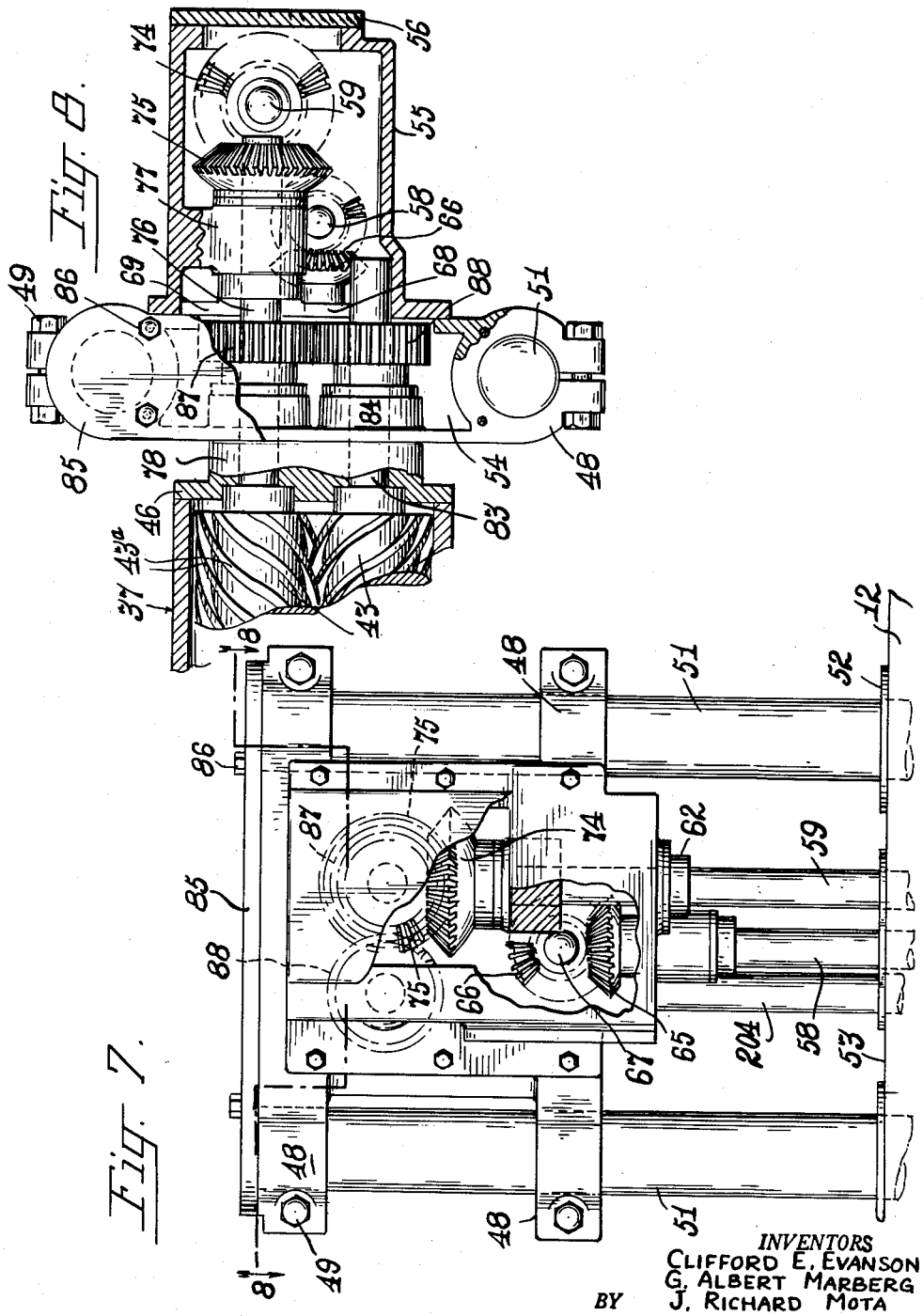

Jan. 5, 1965 C. E. EVANSON ETAL 3,164,490
AUTOMATIC COATING DEPOSITOR
Filed Dec. 4, 1961 7 Sheets-Sheet 5

INVENTORS
CLIFFORD E. EVANSON
G. ALBERT MARBERG
J. RICHARD MOTA
BY
Attorney

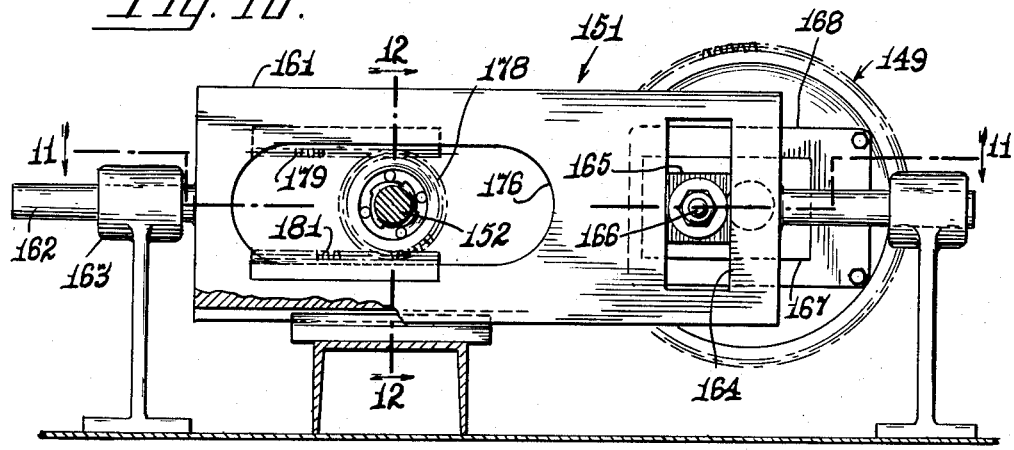
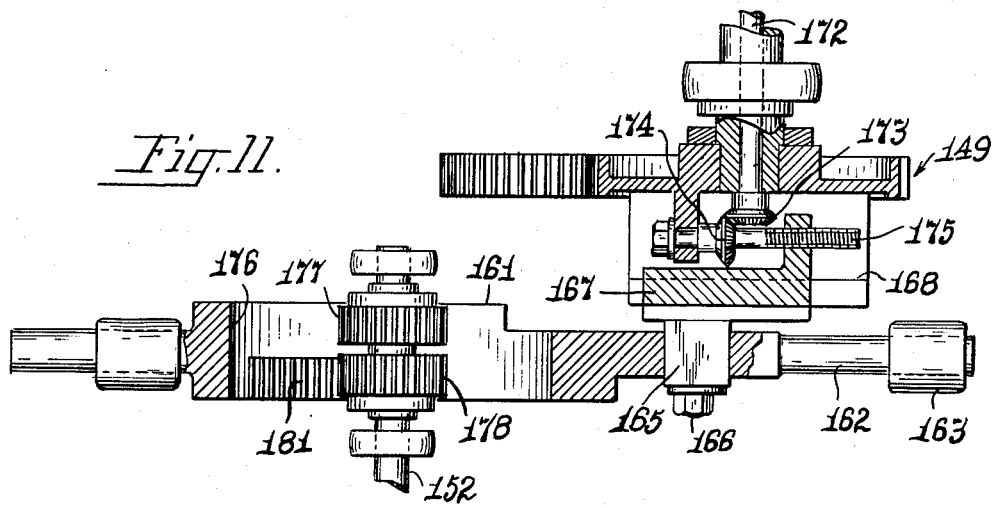

Jan. 5, 1965

C. E. EVANSON ETAL 3,164,490

AUTOMATIC COATING DEPOSITOR

Filed Dec. 4, 1961

INVENTORS
CLIFFORD E. EVANSON
G. ALBERT MARBERG
J. RICHARD MOTA
BY

*Attorney*

United States Patent Office 3,164,490
Patented Jan. 5, 1965

3,164,490
AUTOMATIC COATING DEPOSITOR
Clifford E. Evanson, Highland Park, Gustaf Albert Marberg, Oak Park, and Jesus Richard Mota, Mundelein, Ill., assignors to Kitchens of Sara Lee, Inc., Chicago, Ill., a corporation of Maryland
Filed Dec. 4, 1961, Ser. No. 156,769
23 Claims. (Cl. 118—25)

The invention relates to improvements in apparatus for depositing icing on bakery products such as cakes and the like, and is particularly concerned with the novel construction, assembly and operation of an automatically operated apparatus adapted to deposit a layer of icing of predetermined thickness and pattern on cakes and the like as the latter are fed in an endless stream to and through said apparatus.

The apparatus, herein disclosed in an exemplary form, is designed to deposit accurately measured quantities of icing on cakes and the like that are fed thereto in one or more rows by means of continuously driven conveyor means operating at speeds within the operating speed of the apparatus. The apparatus is readily adjustable so as to vary the operating speed of the icing extruding means therein, and to adapt it for icing various size rectangular or round cakes and the like. The icing extruding means is of a kind that avoids any change in the properties of the icing which might result from excessive pressure or temperature changes during extrusion of the icing onto the cakes. The structure also embodies means to facilitate ease of cleaning and change-over for short runs of various types of icing, for maintenance and part replacement and may be critically adjusted during operation and be manually operated during setup and testing.

More particularly, the apparatus includes a mobile power and icing extrusion assembly that may be positioned properly in relation to a supply conveyor means and then secured in such position. This assembly comprises generally a cabinet structure housing the power supply means and a multiplicity of variable speed power transmission mechanisms for driving conveyor means onto which cakes are delivered from the supply conveyor means for carrying them beneath the icing extrusion assembly mounted for height adjustment on said cabinet structure and operably connected with selected of said power transmission mechanisms so as to be actuated in timed sequence with the passage of a cake or cakes therebeneath. The extrusion assembly includes novel means to regulate the pressure and volume of icing deposited on each cake during opening of valve means therein and also means to insure proper coordination of a pressure regulating pump and cause icing delivered by said pump to the valve means while said valve means is closed to be returned back to the icing supply. Preferably, electrical sensing means is provided to prevent the extrusion of icing when one or more cakes are missing in the icing deposit position.

It is therefore an object of the invention to provide a novel icing apparatus of the character described.

Another object is to provide novel icing extrusion assembly.

Another object is to provide icing extrusion assembly with novel means to facilitate easy and quick replacement of the valve means therein to adapt it for depositing icing on cakes of various sizes and shapes.

Another object is to provide icing extrusion assembly with novel means to insure proper coordination between the icing pressure applying means or pump and the extrusion valves therein and to return pressurized icing to its supply source when the valves are closed or when the pressure exceeds the valve extrusion capacity.

Another object is to provide common drive means for the conveyor means and the icing extrusion assembly which includes readily adjustable means for controlling the speed of operation, and means to select manually the mode of operation for applying icing to rectangular or round cakes.

Another object is to provide common drive means for the conveyor means and the icing extrusion assembly which includes readily adjustable means for controlling the position of cakes to be iced with respect to the icing extrusion assembly without interrupting the operation of the drive means.

Another object is to provide common drive means for the conveyor means and the icing extrusion assembly which includes readily adjustable means for controlling the amount of icing that is pumped by the extrusion pump during each cycle and this may be accomplished when icing is being applied to rectangular or round cakes.

Another object is to provide common drive means for the conveyor means and the icing extrusion assembly which includes readily adjustable means for controlling the time length of each icing extruding cycle.

Another object is to provide common drive means for the conveyor means and the icing extrusion assembly which includes readily adjustable means for controlling the thickness of the icing while maintaining an even coating.

Another object of this invention is to provide an icing extrusion assembly having pump means delivering icing to a valve in a quantity versus time pattern equivalent of one-half of a sine wave and means for varying the amplitude of the pattern and/or varying the period of the pattern all without interrupting the operation of the machine.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 1 is a side elevational view of an icing apparatus embodying the features of the invention.

FIG. 2 is a top plan view thereof.

FIG. 3 is a end elevational view of the icing extrusion assembly, showing the conveyor means in transverse section.

FIG. 4 is a longitudinal vertical sectional view of the icing extrusion assembly, taken substantially on line 4—4 of FIG. 3.

FIGS. 5 and 6 are perspective views of the icing extrusion valves used for the extrusion of icing on rectangular and round cakes, respectively.

FIG. 7 is an end elevational view of the mounted end of the icing extrusion assembly, showing parts of the gear box broken away.

FIG. 8 is a horizontal sectional view of the gear box assembly, taken substantially on line 8—8 of FIG. 7, and showing parts in elevation.

FIG. 9 is a schematic diagrammatic view of the drive and transmission means contained within and on the cabinet structure.

FIG. 10 is an elevational view of the scotch yoke and sprag clutch drive assembly, taken substantially along line 10—10 of FIG. 9.

FIG. 11 is a horizontal sectional view of the FIG. 10 assembly, taken substantially on line 11—11 of FIG. 10.

FIG. 12 is a detail sectional view taken on line 12—12 of FIG. 10, showing parts in elevation.

FIG. 13 is a schematic view of the electrical control circuitry.

Referring to the disclosure in the accompanying drawings and particularly to the assembly best illustrated in FIGS. 1 and 2, the apparatus includes a mobile unit, generally indicated at 11, comprised essentially of a cabinet 12 within which is mounted the power supply means and drive mechanism to be described hereinafter. The cabinet 12 has extending longitudinally thereof and above its top surface an endless conveyor 13 above which is arranged a plurality of transversely adjustable guides 14. Arranged above said conveyor and guide assembly is a vertically adjustable power operated icing extrusion assembly generally indicated at 15.

The mobile unit 11 preferably is mounted on casters 16 adapting it for positioning to align conveyor 13 with a supply conveyor system, generally indicated at 17, which is adapted to deliver one, two or more rows of cakes to conveyor 13 from a source of supply. When the mobile unit 11 is properly positioned it may be held securely against displacement by pressure shoes 18 mounted for vertical adjustment on the base thereof and movable into bearing engagement with the floor 19 or other support surface.

The drive mechanism contained within cabinet 12 and to be described in detail hereinafter includes a driven shaft 21, illustrated in FIG. 9 and in dotted lines in FIG. 1, which mounts a sprocket 22 connected to said shaft through a planetary drive assembly 23 including a manually adjustable control wheel 24 disposed on the outside of cabinet 12. Still referring to FIGS. 1 and 9, an endless chain 25, is trained over said sprocket 22 and has drive connection with a sprocket 26 and a shaft 27 which extends to the outside of cabinet 12 and carries a sprocket 28 having an endless chain 29 connecting it with sprocket 31 on conveyor shaft 32. During operation of shaft 21, the conveyor 13 is operated at a predetermined speed, determined by adjustment of the drive assembly 103, as will be explained later, to carry two or more rows of cakes, delivered to it from supply conveyor 17, toward, beneath and then away from the icing extrusion assembly 15. Preferably, the conveyor 13 is of a kind including longitudinally spaced transverse pusher bars 33 (FIGS. 2, 3, 4 and 9) connected at their ends to endless chains supported by rollers 34 (FIG. 3) for travel along suitable guide rails 35. In operation, the pusher bars advance the cakes over a grilled surface 36 arranged beneath the upper reach thereof.

Icing Extrustion Assembly 15

The icing extrusion assembly 15, illustrated in detail in FIGS. 3 to 8, is essentially contained within a housing 37 including an extruder head 38 having a vending orifice 39 in its bottom wall, and an upwardly outwardly flared hopper supporting portion 41 upon which an icing supply hopper 42 is mounted. The extruder head 38 contains a pair of pressure or pump rolls 43 and a contour control valve 44 all suitably journalled in end plates 45–46 that are removably secured, as by means of machine bolts 47, to the open ends of the extruder head. End plate 45 is readily accessible for easy removal to facilitate disassembly of the pressure rolls and valve element for maintenance, cleaning or replacement.

The end plate 46 has formed integral therewith and extending outwardly laterally on each side of its vertical center, a pair of vertically aligned saddle clamps 48, which are securely mounted, as by tightening bolts 49, to the upper ends of guide rods or posts 51 that extend downwardly through bearing members 52 in the top wall 53 of cabinet 12. For a purpose to be described presently the saddle clamps 48 define between them a chamber 54 (FIG. 8) open on the side disposed away from housing 37.

The said open side of the saddle clamp is closed by a gear box 55, the interior of which is in communication with chamber 54. A removable end plate 56 defines the end wall of said box which, together with a removable side wall plate 57, affords access to the interior thereof. As is perhaps best shown in FIGS. 3, 7 and 8, the gear box 55 has a pair of vertical shafts 58, 59 extending thereinto through bearings 61–62 respectively, in its bottom wall. These shafts extend downwardly therefrom and into cabinet 12 through bearing sleeves 63–64 respectively, in the cabinet top wall 53 and are connected in a manner to be described presently with power drive mechanism contained within said cabinet.

Shaft 58 carries on its upper end, within gear box 55, a miter gear 65 that meshes at all times with a miter gear 66 on a horizontal stud shaft 67, journalled for free rotation in a bearing 68 in gear box wall 69. Said stud shaft 67 is connected with one end of the contour control valve 44 in the extruder head. The other end of said contour control valve 44 carries a stud shaft 71 (FIG. 3) that is journalled for free rotation in a bearing boss 62 on the extruder head housing end plate 45. The contour control valve 44 comprises a tubular structure having two or more pairs of diametrically opposed openings 73 therein which are of a size and shape to permit the requisite amount of icing to be delivered therethrough during machine operation. For example, the openings 73 may be rectangular as shown in FIG. 5, to provide extrusion openings for the icing of rectangular cakes or they may be substantially oval in shape, as at 73a, illustrated in FIG. 6, for the icing of round cakes. The larger the cake, the greater the number of degrees of arc that the extrusion openings on the valve structure 44 extend. This is apparent since the valve 44 must be open the entire time that a cake to be iced is operably situated under the valve structure 44.

The other vertical shaft 59 carries on its upper end and within gear box 55, a miter gear 74 that is in constant mesh with a miter gear 75 secured firmly on one end of a shaft 76. As best shown in FIG. 8, shaft 76 is journalled in a bearing boss 77 within said gear box and it extends through a bearing journal 78 in the extruder head end wall 46 and is firmly connected with one end of one of the pair of pressure rolls 43, the other end of which has a stud shaft 79 (FIG. 1) journalled in a boss 81 formed on the extruder head end plate 45. The companion pressure roll 43, carries a stud shaft 82 on one end which also is journalled in said boss 81 and it carries a shaft 83 (FIG. 8) on its other end that extends through a journal bearing 84 in end plate 46 and into the gear box.

Upon referring particularly to FIG. 8 it will be noted that the space 54 defined by saddle clamps 48 is in communication with the interior of gear box 55 and that said space is closed on its upper end by a cover plate 85 bolted, as at 86, to said clamp to complete the gear box enclosure and also to provide an overlying cap for each post 51 to prevent the extruder assembly from sliding downwardly relative to said posts in the event of loosening of the clamp bolts 49. The space 54 affords clearance for mounting a pair of constantly meshed pinions 87–88, one on each shaft 76–83, to provide a drive connection between said shafts for rotation thereof in opposite directions during operation of the apparatus.

The pressure rolls 43 are alike and each is formed on its exterior surface with one or more helical or herringbone teeth 43a which are adapted to mesh loosely but do not have driving contact. The teeth are cut undersize with the spaces oversize. The pitch of the helical teeth is exaggerated in the drawings for effect and best results have been obtained when the pitch angle is reduced. These rolls and the helical teeth thereon function as displacement elements for displacing icing from the hopper portion 41 into a space 89 (FIG. 4) beneath said rolls and above the valve element 44.

Operation of the pump rolls 43 may occur when the valve element 44 is wholly or partially closed consequently, there are instances during machine operation when the pump rolls 43 will deliver a quantity of icing into space 89 which is in excess of that allowed to pass through the valve element 44. Owing to the nature of the icing mix it is impractical to permit icing to accumulate under excessive pressure or otherwise collect in space 89. Accordingly, a pressure relief passage is provided for conveying any excessive quantity of icing collected in space 89 back to hopper portion 41. As best shown in FIGS. 3 and 4, this means may comprise an outlet passage or conduit 91 in direct communication with space 89 and normally closed by a conventional pressure relief valve 92 of a character having a pressure visual indicator pin 93 protruding therefrom.

When excessive pressure is built up in space 89 during normal machine operation it will be indicated visually by movement of pin 93 and the speed of rotation of the pressure rolls 43 may be adjusted in a manner and by means to be described hereinafter. When excessive pressure results from normal operation of the rolls but when said valve remains closed, as hereinafter explained due to the absence of a cake beneath vending orifice 39, the relief valve 92 will move into an open position thus permitting the icing delivered into space 89 to be returned to the hopper portion 41 under its own pressure build-up via a conduit 94 leading from said valve to said hopper portion 41. Obviously the relief valve may be set for any desired pressure relief.

Drive Transmission

As hereinabove mentioned, the mobile cabinet 12 houses novel drive transmission and speed control means for imparting proper relative motions to the extruder pump 43, the extruder valve 44 and the conveyor 13. The operation is such that in normal operation and after proper adjustment no icing is pumped when the extruder valve 44 is closed. The drive mechanism also has associated with it an electrical sensing device 95 preferably located at the inlet end of conveyor 13 which is operable to prevent the deposit of icing when one or more cakes is missing in the icing deposit position. This sensing device 95 is shown in FIG. 13 and it functions to disengage the extruder pump 43 from its drive mechanism to prevent it from operation. The details of the wiring schematic are not illustrated in FIG. 13 except diagrammatically as the central control and signal unit 150. It is believed that such circuits are straight forward and form no part of this invention and can be readily formulated by those skilled in the art by just being informed of their function. Therefore, the details of the interconnections of various switches such as switch 95 and other switches and circuits to be mentioned will not be given in that it is believed that the inventive concepts will be more fully brought forward without the excess of verbiage.

Referring now particularly to FIGS. 9 and 13 power for the apparatus is provided through an electric motor 102 coupled with a mechanical output speed control device 103, such as one known to the trade as a "varidrive," and which may be manually adjusted for infinite speed control through manipulation of a hand wheel 104 that may be adjusted during machine operation. An output shaft 105 leading from the speed control device 103 carries a miter gear 106 that is meshed with a miter gear 107 on shaft 108 having a drive connection, through miter gears 109–111, with a shaft 112 of one element of a variable secondary speed control unit 113 of conventional design such as for example what is termed in the trade as a V-drive and which includes a controlled output shaft 114.

The shaft 108 also carries sprockets 115–116 firmly thereon. The sprocket 115 is connected by chain 117 with a sprocket 118 on the input shaft 119 of a worm gear speed reducer 121 of conventional design having opposed shafts 122–123 extending therefrom and rotatable at uniform speeds in the same direction. Shaft 122 carries a miter gear 124 which is meshed with a miter gear 125 splined on the vertical valve driving shaft 58 depending from the extruder head gear box 55. The ratio of gears 124–125 is 1 to 2 so that during machine operation, the shaft 58 and the valve element 44 driven thereby are rotated 180° for each complete rotation of shaft 122. During initial setup, or for purposes of subsequent adjustment, the shafts 122–123 may be rotated manually by means of a hand wheel 126 carried on a shaft 127 extending to the outside of said cabinet and which is connected by miter gears 128–129 to a shaft 131 carrying a sprocket 132 connected by chain 133 with sprocket 116 on shaft 108. Thus, the valve element 44 may be initially adjusted without starting the motor 102 to insure proper extrusion of icing during machine operation and in coordination with other operational and control mechanism described hereinafter.

As noted hereinabove, the relative speed of rotation of output shaft 114 is controlled by adjustment of the secondary speed control unit 113. The speed control unit 113 which can be what is termed a V-drive can be adjusted by turning, for example, a handle (not shown) which would cause the effective pitch diameters of the sheave connected to the shaft 112 and the sheave connected to the shaft 114 to vary thus causing the shaft 114 to change in speed. In the V-drive a belt interconnects the aforementioned sheaves to couple power from shaft 112 to shaft 114. This shaft 114 carries pinions 134 and 135, which are freely rotatable thereon and each of which has a clutch face 136–137 respectively, either of which may be selectively engaged by a clutch element 138 keyed to shaft 114 and shiftable therealong. Shifting of clutch element 138 is accomplished manually by means of a shift rod 139 that extends through the front wall of cabinet 12 and is connected to said clutch element by a yoke carrying rod 141 (FIG. 1). This clutch affords selective drive means for connecting the speed control unit 113 to mechanism operable when square or rectangular cakes are to be iced. As more fully described hereinafter, when round cakes are to be iced, the drive is such as to control the length of icing deposited whereas when rectangular cakes are to be iced the volume of icing deposited is controlled thus controlling the icing length or thickness required. The remainder of the drive transmission will be explained in its two alternative forms, one when employed in icing rectangular cakes and the other when employed in icing round cakes.

Icing Round Cakes

When round cakes are being delivered to the extruder head 15 for icing, a valve element 44 having oval shaped openings 73a therein of a type shown in FIG. 6 is used. The oval shaped openings 73a can be cut by wrapping the top view outline of the cake to be iced on the valve element 44, scribing the outline on the valve element 44 and cutting in accordance thereto and then doing the same thing on the opposite side of the valve element 44. The clutch elements 138–137 are engaged to drive pinion 135 and at the same time move a selector switch 138a (FIG. 13) into one of its two positions to close the requisite circuits (not shown) in a central control and signal unit 150 for round cake icing operation. Pinion 135 is meshed with a gear 142 on a shaft 143 carrying a pinion 144 meshed with the drive gear 145 of a one revolution clutch 146 engaged by a solenoid actuated trip lever 147. A one revolution clutch is known to those in the art and it engages for one revolution no matter what the speed (within limits) and then disengages itself, each time the trip lever is activated. A switch actuator 148, to be further explained (FIGS. 9 and 13) is mounted on the cabinet and actuated when a cake advances into icing position beneath vending orifice 39, and includes stop-start switches 148a and 148b respectively, operable through the central control and signal unit 150 to deliver a signal current to clutch trip solenoid 147 to actuate one revolution solenoid clutch 146 and thus impart rotation to a harmonic drive head 149 which transmits motion to a scotch yoke assembly 151, hereinafter described in detail, which operates to cause proportional rotational displacement to its output shaft 152. As shown in FIG. 9, shaft 152 carries a sprocket 154 connected by a chain 155 to a sprocket 156 on shaft 157 mounting a pinion 158 that is meshed with a pinion 159 attached to the pump drive shaft 59 depending from gear box 55. Such shaft displacement rotates the pump rolls 43 a proportionate amount and the aforedescribed arrangement is such that the volumetric displacement of the pump is directly proportional to the effective area of the valve opening 73a so that a round layer of icing of uniform thickness is deposited. The pattern of icing amount versus time for round cakes is equivalent to one-half of a sine wave as will be discussed further.

The scotch yoke assembly 151, best shown in FIGS. 10–12, is provided to insure correct drive relationship between the pump and valve element. The harmonic drive head 149 and the scotch yoke assembly 151 take the constant rotational movement of the one revolution solenoid actuated clutch 146 and transfer it into a rotational motion or velocity versus time pattern equal to that of one-half of a sine wave and this motion appears on the output shaft 157 and is thereby coupled to the pump 43. The scotch yoke assembly 151 includes a vertically disposed plate 161 having axially aligned stud shafts 162 one extending outwardly from each end thereof and slidable in supports 163. A vertically elongated slot 164, adjacent to one end of said plate receives a slide block 165 carried on an eccentric 166 forming part of the harmonic drive head 149, to be explained hereinafter. As best shown in FIG. 11, eccentric 166 of the harmonic drive head 149 is carried on a member 167 slidable in a carriage frame 168 secured to and rotatable with drive head 149. The amount of eccentricity of eccentric 166 may be adjusted by manual rotation of a hand wheel 169 (FIG. 9) operable through a planetary adjuster 171, as will be explained, for rotating a shaft 172 connected by miter gears 173–174 (FIG. 11) with a screw 175 threadingly engaged with member 167. This assembly is such that the eccentric can be adjusted irrespective of whether the apparatus is idle or in operation thus affording means for infinitely controlling the length of reciprocation of plate 161. The planetary adjuster 171 is connected to two shafts 172 and 172' and normally causes these shafts to rotate in unison. However, turning of the handle 169 moves shaft 172 with respect to shaft 172' through a predetermined arc thus causing the eccentric 166 to move in or out ont he harmonic drive head 149 a predetermined distance. After the wheel 169 is no longer turned the shafts 172 and 172' resume rotation in unison but shifted with respect to each other. Planetary adjusters of this type are known and can be readily designed or purchased, it being sufficient that one skilled in the art knows the function they must perform.

The other end portion of said plate 161 has an elongated opening 176 through which the shaft 152 is extended. A pair of clutched directional pinions 177–178 each capable of drivable rotation in one direction only are carried on said shaft 152 within opening 176 and are in constant mesh one with each of a pair of racks 179–181 respectively, carried by said plate 161. Pinion 177 drivably engages rack 179 when the plate 161 moves in one direction and spins in the rack 179 when the plate 161 moves in the opposite direction and vice versa for pinion 178 and rack 181. During plate reciprocation, the racks and pinions impart continuous rotation to shaft 152 but at a speed determined by the length of the stroke of plate 161. Thus, operation of the pressure pump rolls 43 is controllable at all times to regulate the volume of icing delivered through the valve element 44.

The extruder switch actuator 148 is electrically positioned in the energizing circuits (not shown) of the one revolution clutch 146 and specifically in the energizing circuit (not shown) of the solenoid 147. The extruder switch actuator 148 is also electrically positioned in the energizing circuit (not shown) of the magnetic clutch 182 to be described. The extruder switch actuator 148 must be activated before the pump 43 will deliver any icing to the valve 44 as will be seen. The pump actuator is mechanically connected to the same shaft of the planetary gear arrangement as is the conveyor 13 and is driven through the sprocket and chain drive 22', 26' and 25', respectively. The extruder switch actuator 148 is thereby synchronized with the movement of the conveyor 13 and the operation of the pump 43 and valve 44.

The extruder switch actuator 148 activates what can be a micro-switch 148b (FIG. 13) after so many revolutions or after so much travel of its input shaft 27' and so many revolutions or so much travel of its input shaft 27' later, turns off what can be a micro-switch 148a (FIG. 13). The switch actuator 148 can be fairly simple and can consist of a cam mounted on the shaft 27 having a micro-switch activating extension. Two micro-switches 148a and 148b can be shiftably mounted with respect to each other and to the cam. The micro-switches 148a and 148b can be moved to control the switch actuator 148 as desired. Inasmuch as it is believed that the switch actuator 148 can be readily designed by one skilled in the art, a more detailed explanation is omitted as the function has been disclosed. After proper adjustment only the volume of icing delivered through the valve element is pumped during each icing operation and at uniform thickness without involving use of the by-pass relief valve 92.

*Icing Rectangular Cakes*

When rectangular cakes are to be iced, a valve element 44 having rectangular openings, as shown in FIG. 1, is installed in the extruder head. The peripheral length and the linear width of the openings 73 should correspond to one-half linear length and full width of the cakes to be iced. Clutch element 138 then is shifted to engage pinion 134 to provide driving power to a magnetic clutch 182 through gear 183 meshed with pinion 134. At the same time, the position of switch 138a is reversed to complete the circuitry through unit 150 to the magnetic clutch 182. The magnetic clutch is an electrically operated mechanical clutch and either locks or unlocks two shafts attached to it depending if it is electrically energized or not and magnetic clutches are well known in the art. When the leading edge of the traveling cake is in proper position under the extruder, the switch actuator 148 now is effective to energize the magnetic clutch to transmit power delivered to said clutch through gearing 134–183, to an output shaft 184 carrying a pinion 185 which drives a reduction gear train comprised of gear 186, shaft 187, pinion 188 and gear 189 meshed therewith, for rotating the shaft 157 through chain drive 191 and operating the pressure pump rolls 43.

During such operation of said pump, a layer of icing of uniform thickness is deposited on the surface of the rectangular cake since the pump displacement is uniform while rotating and the valve opening 73 is constant in width while depositing. As the trailing edge of the cake passes out from under the extruder the magnetic clutch 182 is de-energized to stop the pump. The result is that the pump starts and stops with opening and closing of valve 44 which, in turn, opens and closes over the leading and trailing edges of the cakes as they pass beneath it.

The thickness of the icing layer deposited is also controlled by manual adjustment of a plate 191 (FIG. 4) so as to increase or decrease the effective size of the vending orifice 39 with relation to the outlet opening 192 in the bottom wall of the extruder head 38. Such adjustment may be attained by loosening bolts 193 and manual manipulation of an adjusting screw 194 after which the bolts are again tightened to hold the plate in its adjusted position.

In instances when a wavy deposit of icing is desired, an oscillating plate 195 (FIG. 4), associated with orifice 39, is actuated. Such actuation is effected by operation of a motor 196 that includes an integral mechanical speed output variator commonly known as a "Graham transmission" having a speed adjustment handcrank 197. Motor 196 is mounted on the extruder head 38 and has a drive connection through gears 198–199 with an eccentric 201 operable to oscillate a rock arm 202 connected to plate 195, for imparting reciprocal motion thereto so as to advance and retract its leading edge 203 into and out of the extrusion orifice 39. Such oscillatory motion of the plate 195 produces ridges in the icing being deposited and gives the icing layer the appearance of being hand spread.

In order to adjust the vertical height of the extruder head 38 relative to conveyor 13 for accommodating cakes of varying heights, the extruder head has a rod 204 depending therefrom (FIGS. 7 and 9) having a worm drive connection at 205 with a stud shaft 206 connected by miter gears 207 with a shaft 208 extending to the outside of the cabinet 12 and carrying a hand wheel 209. Manual rotation of said hand wheel in either direction will raise or lower the extruder head.

To initially insure that the cake to be iced will be in the proper spot relative to the orifice 39 when the valve 44 opens the planetary gear arrangement 23 with its adjusting handle 24 is provided. Two shafts 21 and 21' are arranged for rotation in unison through the planetary gear arrangement 23. However, turning handle 24 displaces shaft 21' and sprocket 22 with respect to shaft 21. This results in the conveyor 13 through sprockets 26, 28 and 31, and their associated chains moving relative to the extrusion assembly 15 and consequently the valve 44. Thus by manipulation of the handle 24 the position of the cakes relative to the valve 44 can be adjusted for proper opening. The planetary gear arrangement 23 is believed to be within the skill of those in the art once the function is described.

*Operation*

Assume, for example, that a certain size round cake is to be iced; initially the conveyor 13 is loaded with appropriate cake pans that are uniformly positioned, with respect to the pusher bars 33. Next the wheel 126 is manually turned to place the leading edges of the cakes under the orifice 39. The turning of the wheel 126 as previously explained rotates the shaft 108, thereby advancing the conveyor 13, the valve 44, and the pump 43, all in a manner as has been previously explained. The orifice adjusting plate 191 previously described is adjusted to provide for the proper thickness of icing to be applied to the cakes. The wheel 126 is turned until the valve 44 initially opens and a visual inspection determines whether the conveyor 13 and consequently the cakes to be iced are in the proper position with respect to the orifice 39. If there is any misalignment, the relative positions of the conveyor 13 and the valve 44 are adjusted by turning the wheel 24, as was previously explained, to either move the conveyor 13 and consequently the cake pans back or forward so as to properly align the cakes with the orifice opening 39. This aligning procedure can be followed for initial setup or it can also be done when the machine is running and, due to some cause or another, there is a misalignment. Next the switch actuator 148 is set by manipulating the positions of the microswitches 148a and 148b and this can be done in an empirical manner, that is experimentally determining the proper settings and then recording these settings for each size cake for future reference. The switch actuator 148 only determines when the one revolution solenoid actuated clutch 146 turns on but does not determine when it shuts off as this is determined by the speed at which the solenoid actuated clutch 146 is driven as can be seen later.

If, as has been stated, the cakes to be iced are round then the handle 139 is moved so as to engage the clutch faces 138 and 137 thereby causing the pinion 135 to rotate with the shaft 114 and to consequently rotate the pinion 142; after the aforedescribed adjustments have been made, motor 102 is activated by means not shown to thereby activate the varidrive speed control unit 103. If the speed of the conveyor 13 and the extrusion assembly 15 is undesirable, it can be regulated and while the machine is in operation by turning the handle 104. The handle 104 controls the operation of the varidrive 103 which in turn controls the opening and closing of the valve 44 through the driven shaft 58 as has been previously stated and also controls the speed of operation of the pump 43 through the secondary speed controller 113 and through either the magnetic clutch 182 or the one revolution solenoid actuated clutch 146, in this case, as has been previously explained.

Assume, for example, that the length of the icing dispensed through the valve 44 is not long enough to cover the entire length of the cakes that are being iced. The length of the icing can be controlled by manipulation of the secondary speed control 113 previously discussed. The secondary speed control 113, which as has been suggested, may be what is termed a V-drive, is manipulated so as to decrease the speed of its output shaft 114, which in turn decreases the speed of the shaft 143 through the pinions 135 and 142. This in turn decreases the speed of the pinions 144 and 145 attached to the one revolution solenoid clutch 146. The one revolution solenoid actuated clutch 146 will only turn one revoltuion each time it is activated, however, the length of time that is required for this one revoltuion to occur depends upon the speed of the pinion gear 145. The output speed of the one revolution solenoid actuated clutch 146 will directly affect the output velocity of the harmonic drivehead 149 and consequently the eccentric 166. As has been previously stated, the function of the harmonic drivehead 149 is to take a continuous constant angular velocity and to provide an output having an angular velocity following the pattern of one-half of a sine wave, in other words, going from zero velocity to a maximum velocity on a sine curve and then back to zero again at the end of the cycle. This harmonic output velocity is provided to the output shaft 152 of the scotch yoke assembly 161 and in turn drives the shaft 59 through the sprocket and gear arrangement clearly seen in FIG. 9 to vary the length of time that shaft 59 and consequently the pump 43 will operate. By adjusting the secondary speed control 113 one can increase the length or period of the output velocity curve. The purpose of the sine wave type velocity drive is to drive the pump 43 in exactly the same manner. Inasmuch as the cakes which are to be iced are round, the least amount of icing will be required at the beginning of the cake, the maximum at the center, and again down to a minimum at the back edge of the cake.

If, for example, the length of the icing is longer than the cake, then the length of the icing can be varied this time by speeding up the velocity of the output shaft 114 and secondary control 113. This will cause the one revolution solenoid actuated clutch 146 to require less time to complete its one revolution which in turn will drive the shaft 59 connected to the pump 43 for a shorter length of time. Again, however, the output velocity pattern of the pump 43 will be a sine wave so as to properly coat the round cakes.

Is, for example, the coating is not thick enough, or the coating is too thick, an adjustment can be made to increase or decrease the amount of icing applied to each cake and this can be accomplished by turning the handle 169 of the planetary gear arrangement 171. The turning of the handle 169 causes the planetary gear arrangement 171 having the two concentric shafts attached thereto 172 and 172' to vary the position of the shaft 172 with respect to the shaft 172', thus causing the eccentric 166 to move either in or out on the harmonic drive-head 149, as has been explained. This causes the scotch yoke assembly 161 to either take a longer or a shorter strike length during each cycle of operation. The position of the eccentric 166 determines the speed of the output shaft 152 and in equivalence increases or decreases the amplitude of the velocity drive pattern previously discussed. The increase or decrease of the amplitude of the velocity pattern causes the shaft 59 connected to the pump 43 to still follow the one-half of a sine wave pattern but to do so at a greater or lesser velocity thus pumping more or less icing into the valve 44. This causes the volume of the icing applied to the cakes to be either increased or decreased. The planetary gear arrangement 171 can be adjusted during the operation of the machine without shutting the machine down and thus the coating of icing on the cakes can be adjusted.

Assume, for example, that rectangular cakes are to be iced by the disclosed inventive apparatus. In such a situation, the handle 139 is thrown so as to engage the clutch faces 138 and 136 so as to rotate the pinion 183 through the shaft 114 and the clutch faces 136 and 134. In such a situation the shaft 59 is driven through the linkage including the magnetic clutch 182, the pinions 184, 186 and 188 and so on, as clearly shown in FIG. 9. The length of the icing on the rectangular cakes is controlled by adjusting the micro-switches 148a and 148b of the switch actuator 148 positioned in the operating circuit of magnetic clutch 182. This will determine just how long the magnetic clutch 182 is in operation, thus determining the length of the icing pumped by the pump 43. Settings and positions of the micro-switches 148a and 148b of the switch actuator 148 can be made empirically for various types of rectangular cakes and recorded for use in future setups.

The thickness of the icing can be varied by varying the output speed of the output shaft 114 of the secondary speed control 113. The length of time that the magnetic clutch will be on is determined by the micro-switches 148a and 148b. However, the speed at which the pump 43 is operated is determined by the output speed of the output shaft 114 of the secondary speed control 113 inasmuch as there is a direct gearing between the output shaft 114 and the shaft 59 connected to the pump 43. Therefore, by either speeding up or slowing down the output speed of the output shaft 114, the thickness or volume of the coating of icing of the rectangular cake can be varied.

As has been previously explained, the wavy appearance can be placed upon the cakes whether they are rectangular or round cakes by energizing the motor 196.

As many possible embodiments may be made in the invention, and as many changes might be made in the embodiments above set forth or shown in the accompanying drawings, the same are to be interpreted as illustrative and not in a limiting sense.

Having thus described the invention, what is claimed as new and desired to be secured by Letters Patent of the United States is:

1. In apparatus icing cakes and the like, conveyor means for advancing cakes through said apparatus, an icing extrusion assembly arranged above said conveyor and beneath which said cakes advance, means to supply icing to said extrusion assembly, valve means in said extrusion assembly, pump means operable to deliver icing from said supply means to said valve means, an extrusion orifice in the extrusion assembly and through which icing delivered by said valve means is discharged onto a cake passing therebeneath, a common source of power for synchronously operating said conveyor, valve means and pump means, first drive means driven by said common source of power for driving said pump means at a relatively constant angular speed, second drive means driven by said common source of power for driving said pump means at a constantly varying angular speed, and means for selecting either of said first drive means or said second drive means.

2. In apparatus icing cakes and the like, conveyor means for advancing cakes through said apparatus, means on said conveyor means to maintain the cakes spaced apart uniformly, an icing extrusion assembly arranged above said conveyor and beneath which said cakes advance, means to supply icing to said extrusion assembly, valve means in said extrusion assembly, pump means operable to deliver icing from said supply means to said valve means, an extrusion orifice in the extrusion assembly and through which icing delivered by said valve means is discharged onto a cake passing therebeneath, a common source of power for synchronously operating said conveyor, valve means and pump means, means operable to vary the operating cycle of said valve means, means to adjust the conveyor position to coordinate the passage of a cake beneath said extrusion orifice with the opening and closing of said valve means, means to cause said pump means to deliver icing to said valve means only when said valve means is delivering icing to said orifice.

3. In apparatus icing cakes and the like, conveyor means for advancing cakes through said apparatus, means on said conveyor means to maintain the cakes spaced apart uniformly, an icing extrusion assembly arranged above said conveyor and beneath which said cakes advance, means to supply icing to said extrusion assembly, valve means in said extrusion assembly, pump means operable to deliver icing from said supply means to said valve means, an extrusion orifice in the extrusion assembly and through which icing delivered by said valve means is discharged onto a cake passing therebeneath, means to adjust the size of said orifice, a common source of power for synchronously operating said conveyor, valve means and pump means, means to adjust the position of the conveyor to coordinate the passage of a cake beneath said extrusion orifice with the opening and closing of said valve means, means to cause said pump means to deliver icing to said valve means only when said valve means is delivering icing to said orifice, and pressure relief means operable to return icing pumped in excess of the valve capacity back to the supply means.

4. In apparatus icing cakes and the like, conveyor means for advancing cakes through said apparatus, means on said conveyor means to maintain them spaced apart uniformly, an icing extrusion assembly arranged above said conveyor and beneath which said cakes advance, means to supply icing to said extrusion assembly, valve means in said extrusion assembly, pump means operable to deliver icing at a predetermined pressure to said valve means, an extrusion orifice in the extrusion assembly and through which icing delivered by said valve means is discharged onto a cake passing therebeneath, a common source of power for synchronously operating said conveyor, valve means and pump means, and means for driving said pump means at a constantly varying angular speed.

5. In apparatus icing cakes and the like including a conveyor for advancing cakes through said apparatus, an icing extrusion assembly arranged above said conveyor and beneath which said cakes advance, an icing supply chamber in said extrusion assembly, rotary valve means in said extrusion assembly, rotary pump means operable to deliver icing from said supply chamber to said valve means, an extrusion orifice in the extrusion assembly and through which icing delivered by said valve means is discharged onto a cake passing therebeneath, a power source for synchronously operating said conveyor, valve means and pump means, means for causing said pump means to deliver icing to said valve means only when said valve means is delivering icing to said orifice, and means for driving said pump means at a constantly varying angular speed.

6. In a machine for depositing a layer of icing on articles as they are advanced through said machine, conveyor means for supporting and advancing said articles through said machine, icing extrusion means arranged above said conveyor and beneath which said articles pass, guide means to convey said articles in rows beneath said extrusion means, and valve means operable in the presence of an article beneath said extrusion means for delivering icing to said article while it advances beneath said extrusion means, pump means to deliver icing to said valve means, and means driving said pump means at a constantly varying speed.

7. In the machine recited in claim 6, in which the icing is extruded in the form of a ribbon and means is provided to vary the thickness of said ribbon.

8. In a machine for depositing a layer of icing on articles as they are advanced through said machine, conveyor means for supporting and advancing said articles through said machine, icing extrusion means arranged above said conveyor and beneath which said articles pass, guide means to convey said articles in rows beneath said extrusion means, and valve means operable in the presence of an article beneath said extrusion means for delivering icing to said article while it advances beneath said extrusion means, pump means to deliver icing to said valve means, means driving said pump means at a constantly varying angular speed and for a periodically repeating period of time, and means for varying the length of the period while said machine is in operation.

9. In an icing machine including a movable conveyor for a stream of articles to be iced, means arranged above said conveyor for delivering icing from a supply source to said articles, said means comprising a contour control valve and pressurizing means for delivery of icing to said valve, continuous drive means operable to actuate said valve to deposit a layer of icing on an article passing beneath said valve, drive means to actuate said pressurizing means in synchronism with operation of said valve, and means driving said pressurizing means at a constantly varying angular speed comprising means for changing constant angular velocity into a periodically repeating one-half sine wave angular velocity pattern.

10. In the icing machine recited in claim 9 in which means is provided to return icing delivered to said valve in excess of its capacity back to its supply source.

11. In the icing machine recited in claim 9 in which means is provided to cause uneven distribution of the icing layer onto said article.

12. In an icing machine having a movable conveyor for a stream of articles to be iced, means arranged above said conveyor for delivering icing to said articles, said means comprising a contour control valve and pressurizing means for delivery of icing to said valve, means operable to actuate said valve to deposit icing on an article passing beneath said valve, means to actuate said pressurizing means in synchronism with operation of said valve, first drive means operable to drive said pressurizing means at a constant angular velocity, second drive means operable to drive said pressurizing means at a constantly varying angular velocity, and means for selecting either said first drive means or said second drive means.

13. In an icing measuring and extrusion apparatus, a body having a supply hopper at the upper end thereof, a pair of pressure rolls forming the bottom of said hopper and between which icing is passed, a contour control valve arranged beneath and spaced from said pressure rolls, means operable to synchronize operation of the pressure rolls and valve to deliver a predetermined quantity of icing to said valve for discharge from the body, and means for driving said pressure rolls in an angular velocity pattern of one-half a sine wave and for a periodically repeating period, said last mentioned means comprising a one revolution solenoid actuated clutch and means for changing constant angular velocity into a periodically repeating one-half sine wave angular velocity pattern.

14. In an apparatus for depositing a layer of icing on cakes advancing therebeneath, conveyor means for said cakes, an extrusion device comprising a housing having a supply chamber at its upper end and a vending orifice in its bottom, means to support said device spaced above said conveyor, means to adjust said device vertically, a pair of pressure rolls in said housing and between which icing from the supply chamber is passed, a rotary valve element beneath said pressure rolls, separate drive means for said conveyor, pressure rolls and said valve element, a power source common to all of said drive means and means for operating said pair of pressure rolls only when said rotary valve is in condition to deposit icing on said cakes advancing therebeneath.

15. In apparatus for applying a layer of icing to cakes, conveyor means for said cakes including means to maintain said cakes in spaced apart relation, valve means operable to deposit a measured quantity of icing on a cake as it passes beneath said valve means, pump means to deliver icing to said valve means, common drive means for said conveyor, valve means and pump means, means to adjust the operating speed of said drive means, means to adjust the position and speed of said conveyor relative to the rate of operation of the valve means to insure proper positioning of a cake to receive icing when said valve means is actuated, and magnetic clutch means selectively operated to cause said pump means to deliver icing to said valve means only when said valve means is operable to deposit icing on a cake as it passes beneath said valve means.

16. In apparatus recited in claim 15 in which control means is provided to prevent pump operation when no cake is positioned to receive icing during machine operation.

17. In apparatus for applying a layer of icing to cakes, conveyor means for said cakes, means to control the speed of operation of said conveyor, means including a valve operable to deposit icing of said cakes at a predetermined station along their path of travel, drive means to control the operation of said valve, pump means operable to deliver icing to said valve at a predetermined pressure, drive means to control operation of said pump means and such that said pump means delivers icing to said valve means only when said valve is capable of depositing icing on said cakes, and manual means operable to vary the operating speeds of the valve and pump means relative to each other and to the speed of said conveyor.

18. An icing extruding apparatus comprising, a housing having an icing supply reservoir at its upper end and an extrusion orifice, a rotary valve journalled in said housing adjacent to said orifice, a pair of pump rolls journalled in said housing between said supply reservoir and valve, drive shafts one for each pump roll and one for said valve, drive means common to both pump roll shafts for rotating said pump rolls in unison and in opposite directions to deliver icing to said valve, drive means for said valve drive shaft, means to adjust the drive means for the pump rolls to vary their speed of rotation, a power source common to both of said drive means, and means operable to vary the relative speed of operation of the pump rolls and valve.

19. An icing extruding apparatus comprising, a housing having a material supply reservoir at its upper end and an extrusion orifice in its bottom wall, a rotary valve journalled in said housing adjacent to said orifice, a pair of pump rolls journalled in said housing between said supply reservoir and valve, drive shafts one for each pump roll and one for said valve, drive means for one of the pump roll shafts, means connecting said pump roll shafts for rotating said pump rolls in unison and in opposite directions to deliver material to said valve, drive means for said valve drive shaft, means to adjust the drive means for the pump rolls to vary their speed of rotation, a power source common to both of said drive means, and means operable to prevent effective operation of the pump rolls when the valve is in closed position.

20. An apparatus for depositing a viscous fluid on products over an area of predetermined configuration of each product, said apparatus comprising a valve assembly, conveyor means for conveying said products in spaced succession in a path extending below said valve assembly, drive means for driving said valve assembly and said conveyor means in synchronization, said valve assembly comprising a pump element and a valve element, means in said drive means for driving said pump element so that the volume of the fluid output of said pump element varies according to a periodically repeating one half sine wave pattern, said valve element arranged to permit a steady flow of fluid from said pump and in a manner as to form a circle when deposited on each product.

21. An apparatus for depositing a viscous fluid on products over an area of predetermined configuration of each product, said apparatus comprising a valve assembly, conveyor means for conveying said products in spaced succession in a path extending below said valve assembly, drive means for driving said valve assembly and said conveyor means in synchronization, said valve assembly comprising a pump element and a valve element, means in said drive means for driving said pump element so that the volume of the fluid output of said pump element varies according to a periodically repeating one half sine wave pattern, and further means in said drive means for driving said pump element such that the amplitude of the fluid output pattern can be increased or decreased, said valve element arranged to permit a steady flow of fluid from said pump and in a manner as to form a circle when deposited on each product.

22. An apparatus for depositing a viscous fluid on products over an area of predetermined configuration of each product, said apparatus comprising a valve assembly, conveyor means for conveying said products in spaced succession in a path extending below said valve assembly, drive means for driving said valve assembly and said conveyor means in synchronization, said valve assembly comprising a pump element and a valve element, means in said drive means for driving said pump element so that the volume of the fluid output of said pump element varies according to a periodically repeating one half sine wave pattern, and further means in said drive means for driving said pump element such that the period of the fluid output pattern can be increased or decreased, said valve element arranged to permit a steady flow of fluid from said pump and in a manner as to form a circle when deposited on each product.

23. An apparatus for depositing a viscous fluid on products over an area of predetermined configuration of each product, said apparatus comprising a valve assembly, conveyor means for conveying said products in spaced succession in a path extending below said valve assembly, drive means for driving said valve assembly and said conveyor means in synchronization, said valve assembly comprising a pump element and a valve element, means in said drive means for driving said pump element so that the volume of the fluid output of said pump element varies according to a periodically repeating one-half sine wave pattern, and further means in said drive means for driving said pump element such that the period of the fluid output pattern can be increased or decreased, said further means comprising a one revolution clutch capable of drivably rotating only one revolution upon each actuation, said valve element arranged to permit a steady flow of fluid from said pump and in a manner as to form a circle when deposited on each product.

References Cited by the Examiner

UNITED STATES PATENTS

| | | | |
|---|---|---|---|
| 1,292,234 | 1/19 | Bausman. | |
| 1,881,747 | 10/32 | Litty et al. | 118—24 |
| 2,260,686 | 10/41 | Segrin | 118—24 X |
| 2,553,592 | 5/51 | Kucklinsky | 118—8 X |
| 2,855,891 | 10/58 | Schmied | 118—2 |
| 2,917,272 | 12/59 | Kollman et al. | 118—25 X |
| 2,981,211 | 4/61 | Emerzian | 118—24 X |

FOREIGN PATENTS 6,554  1908  Great Britain.

RICHARD D. NEVIUS, *Primary Examiner.*

JOSEPH B. SPENCER, *Examiner.*